United States Patent [19]
Davis

[11] Patent Number: 5,092,709
[45] Date of Patent: Mar. 3, 1992

[54] LANDFILL SITE WITH LEACHATE COLLECTION

[75] Inventor: John Davis, Oakville, Canada

[73] Assignee: Steetley Quarry Products Ltd., Hamilton, Canada

[21] Appl. No.: 579,688

[22] Filed: Sep. 10, 1990

[51] Int. Cl.$^5$ ............................................. B09B 1/00
[52] U.S. Cl. ...................................... 405/129; 405/38; 405/43
[58] Field of Search .................. 405/128, 129, 36, 38, 405/43, 51, 52, 53, 55; 210/170

[56] References Cited

U.S. PATENT DOCUMENTS

| | | | |
|---|---|---|---|
| 3,849,991 | 1/1974 | Niederwemmer | 405/38 |
| 3,919,848 | 1/1975 | Sullivan | 405/43 X |
| 4,023,506 | 5/1977 | Robey | 405/43 X |
| 4,345,581 | 8/1982 | Shacher | 405/53 X |
| 4,388,357 | 6/1983 | Luebke | 405/36 X |
| 4,430,021 | 2/1984 | Wagner et al. | 405/129 |
| 4,697,954 | 10/1987 | Grund | 405/128 |
| 4,753,551 | 6/1988 | Brueggemann et al. | 405/128 |
| 4,846,604 | 7/1989 | Holtmann | 405/128 |
| 4,973,196 | 11/1990 | Fuhr et al. | 405/129 |

OTHER PUBLICATIONS

"Municipal Landfills Using Double Liners", *Waste Age.* Oct. 1985, p. 61.

Primary Examiner—Randolph A. Reese
Assistant Examiner—John A. Ricci
Attorney, Agent, or Firm—Mirek A. Waraksa

[57] ABSTRACT

A landfill site is adapted to collect leachate seeping from landfill. A liner impedes passage of liquids between the landfill and a subjacent stratum. A leachate collection layer formed of drainage material is located between the liner and the landfill. Apertured conduits embedded within the drainage material convey the leachate to a pair of subsurface gallery extending along opposite sides of the site and accessible from the surface. Each collection conduit has a discharge end extending through the gallery sidewall where leachate flows can be inspected and obstructions in the conduit can be removed. A groundwater gallery is constructed below the liner in the subjacent stratum and is also accessible from the surface. Blind-ended slots in the upper surface of the stratum are filled with drainage material. Apertured groundwater collection conduits in the slots convey groundwater into the interior of the gallery. The floor of the site is saddle-shaped to encourage leachate and groundwater flows towards the galleries and flows within the galleries to low-points where sumps are located.

15 Claims, 11 Drawing Sheets

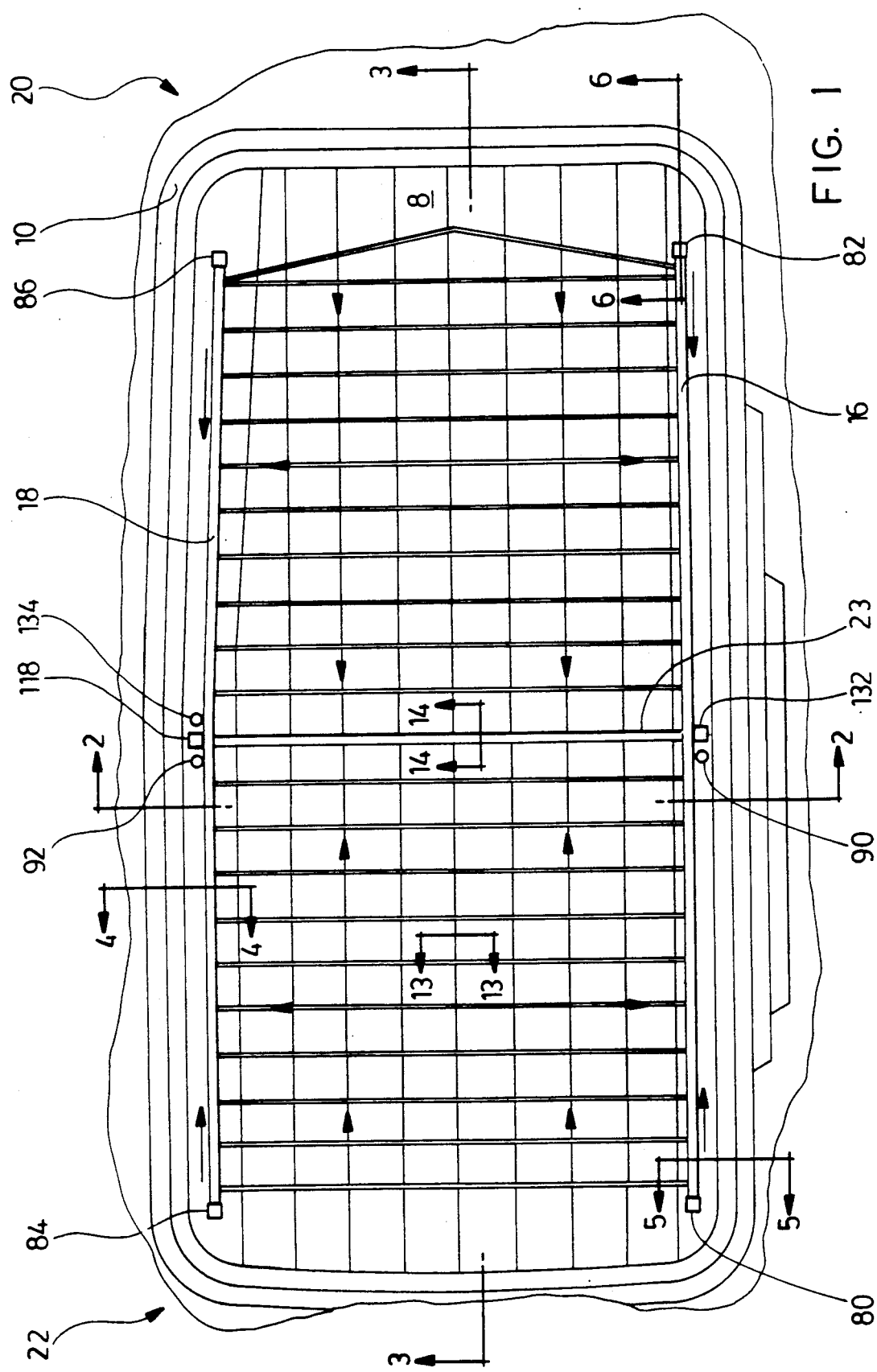

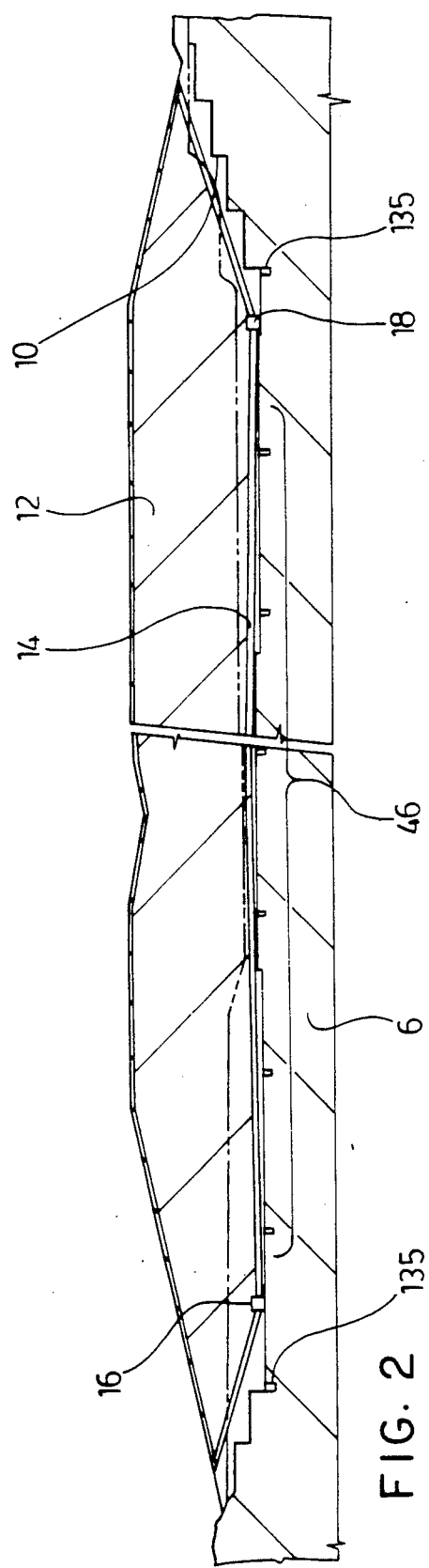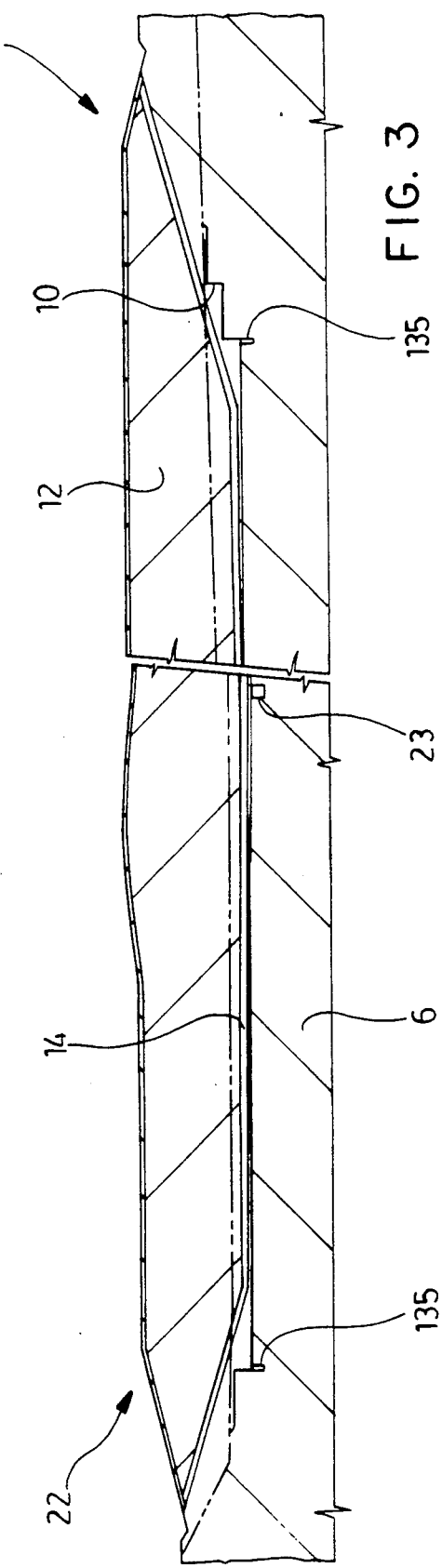

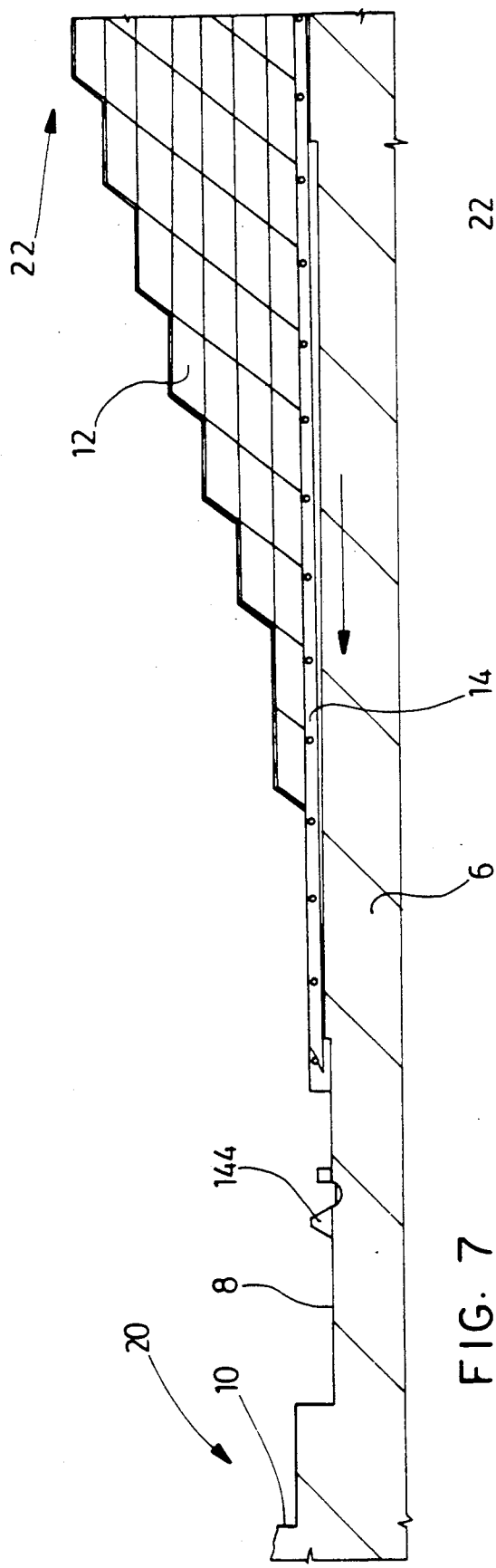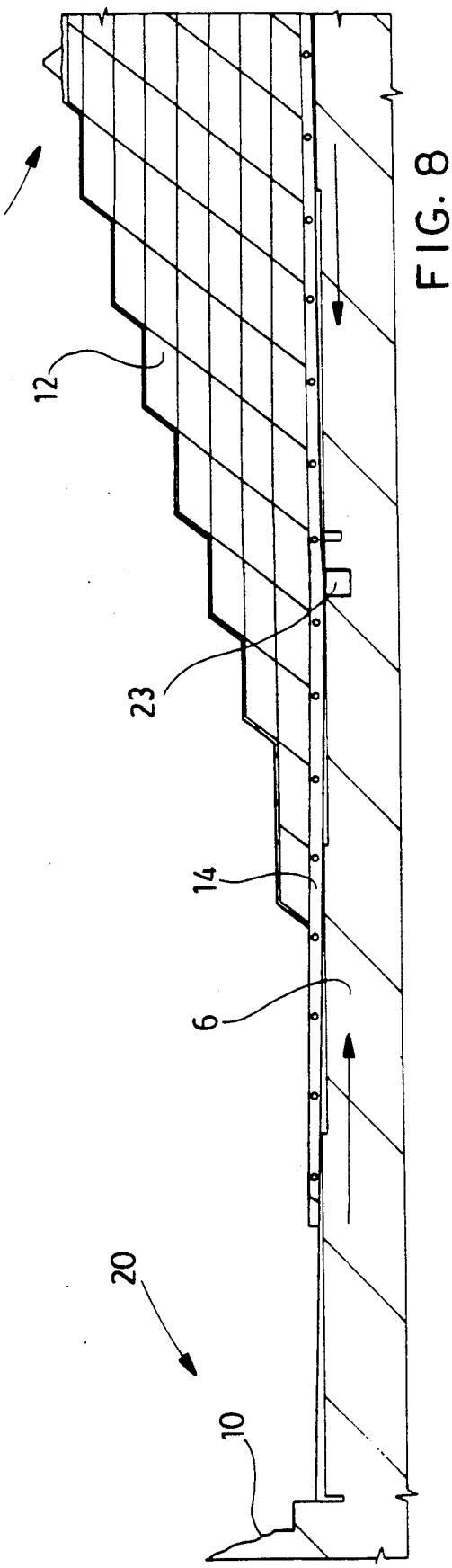

LANDFILL SITE WITH LEACHATE COLLECTION

FIELD OF THE INVENTION

The invention relates generally to landfill sites and more specifically to collection of leachate potentially seeping from landfill.

BACKGROUND OF THE INVENTION

Systems have been proposed for containment and collection of leachate seeping from landfill in response to rainfall. These generally involve a liner of low-permeability material separating the landfill from subjacent strata. The leachate may be collected in apertured conduits in drainage materials above the liner and allowed to flow or be pumped to a disposal location. One problem associated with conventional landfill sites is potential clogging of leachate collection conduits. Another is absence of reliable means for detecting potential failure in leachate collection and also potential failure of the liner. These matters are complicated by the basic nature of the leachate collection system, which is generally formed as a number of distinct subsurface layers buried below a considerable depth of landfill. Failure of the system is commonly detected by checking the quality of groundwater flows in the surrounding area. However, this cannot indicate with any significant precision where a failure has occurred.

Another problem is particularly characteristic of quarrying operations where bedrock is excavated and landfill is thereafter deposited in the site. Bedrock is often below the natural water table of the land surrounding the site. Groundwater tends to seep upwardly through the bedrock and can apply considerable hydrostatic pressure against a liner intended to isolate the landfill from the bedrock. If leachate is collected and removed above the liner, the pressure may not be balanced. This stresses the liner and may contribute to failure of the liner. Also, once bedrock has been removed, stresses in the subjacent geological formations can cause upward heaving of the bedrock. This may rupture the liner.

One system for collecting leachate from waste materials in a landfill site is described in U.S. Pat. No. 4,697,954 issued on Oct. 6, 1987 to Grund. The system comprises a basemented structure with a vaulted ceiling that supports overlying landfill. The structure is constructed of a multiplicity of vault elements supported by hollow piers and arranged to define numerous vertically oriented cavities. Drainage material fills the cavities and a sealing layer is formed over the drainage material. An additional layer of drainage material is deposited on the sealing layer, in contact with the waste material. Locally about each cavity, an upper surface of the sealing layer is inclined to direct liquids seeping from the overlying waste into a vertical conduit embedded in the drainage material of the cavity and extending through the sealing layer. The conduit directs the seepage downwardly into a receptacle in the hollow pier supporting the vault elements defining the cavity. The internal surfaces of the vault elements define additional flow surfaces which direct secondary seepage into the receptacle. The seepage flows from the receptacle through a hose fitted with an inspection glass to a disposal conduit. The Grund system addresses problems of collecting leachate and provides a arrangement permitting inspection of seals, but the cost of erecting such a structure is formidable.

The present invention in its various aspects addresses various problems associated with prior practices regarding landfill sites.

SUMMARY OF THE INVENTION

In one aspect, the invention provides a landfill site adapted for collection of leachate from landfill deposited over a subjacent stratum. The landfill site comprises a liner formed of materials impeding passage of liquids and located between the landfill and the subjacent stratum. A leachate collection layer formed of drainage materials is located between the liner and the landfill. Spaced-apart leachate collection conduits are contained within the drainage material of the leachate collection layer. Each collection conduit has a sidewall apertured to collect leachate accumulating in the drainage material and is oriented to convey the collected leachate along the leachate collection layer to an elongate subsurface gallery. Each leachate collection conduit has a discharge end portion extending through the gallery sidewall and accessible from the interior of the gallery. A passage accessible at the surface of the landfill site permits a worker to enter the subsurface gallery. The gallery is dimensioned to permit the worker to proceed along the interior of the gallery to access each of the conduit discharge end portions. This arrangement provides a relatively cost-effective solution to collection and removal of leachate from landfill. Access to the discharge end portions of the leachate collection conduits permits inspection or detection of leachate flows. It also permits obstruction in leachate collection conduits to be removed from within the interior of the gallery as with a conventional powered snake or with high-pressure water jets.

The described landfill site can be readily adapted to accommodate potential leaks in the linear. A second leachate collection layer formed of drainage materials may be located below the liner. A second liner also formed of materials impeding passage of liquids may be located immediately below the second leachate collection layer such that any leaked leachate tends to accumulate in the second collection layer, avoiding any immediate escape to subjacent water-carrying strata or generally to the surrounding environment. A second multiplicity of spaced-apart leachate collection conduits are contained within the drainage material of the second leachate collection layer. Each collection conduit has a sidewall apertured to collect the leaked leachate and oriented to convey the collected leachate along the second leachate collection layer to the gallery. Each such secondary leachate collection conduit has a discharge end portion extending through the gallery sidewall and accessible from the interior of the gallery. Detection by visual inspection or otherwise of effluent flows from the discharge end portions of the secondary leachate collection conduits provides a fairly reliable indication of leaking of the primary liner. Noting which secondary leachate collection conduits are conveying leachate provides a general indication of the location of the leak. The galleries provide access to allow remedial action to be taken, such as drilling through the side of gallery and grouting the primary liner with epoxy resin or cement, or as a last resort excavation to and repair of the failed section of the primary liner, before any escape of leachate to the environment.

The landfill site might be formed above a stratum carrying groundwater. The groundwater potentially applies unbalanced upward pressure on the liner, as discussed above. In that regard, the invention provides a groundwater gallery or manifold located below the liner. A multiplicity of spaced-apart groundwater collection conduits are located within the subjacent stratum, each of the groundwater collection conduits having an apertured sidewall. Each groundwater collection conduit has a discharge end portion extending through the sidewall of the groundwater gallery or communicating with the interior of the manifold for discharge of collected groundwater. This relieves upward hydrostatic pressure on the liner or liners used. If the site has been excavated into bedrock, slots may be formed in the upper surface of the bedrock to receive the groundwater collection conduits and otherwise filled with drainage material. The slots in the bedrock also relieve stress in the geological formation tending to cause upward thrustiing of the bedrock and reduce the attendant risk of liner rupture.

In another aspect, the invention provides a landfill site structured to enhance the collection and removal of the leachate. A stratum beneath the landfill site is contoured to have a generally saddle-shaped upper surface with a central longitudinal crest, a pair of shoulder sections at opposing ends of the crest, and a pair of valley sections on opposing sides of the crest. A liner formed of materials impeding passage of liquids is located between the landfill and the stratum and has a saddle-shape conforming to the saddle-shaped upper surface of the stratum. A leachate collection layer, formed of drainage material and located between the liner and the landfill, also has a saddle-shape conforming to the saddle-shaped upper surface of the stratum. A leachate collection layer consequently has a pair of lateral side edges one to either side of the central longitudinal crest where low points in the collection layer occur (above the valley sections). A pair of elongate subsurface galleries extend along the lateral side edges of the leachate collection layer, each curving in conformity with the associated lateral side edge. A network of leachate collection conduits is contained within the drainage material of the leachate collection layer and is in fluid communication with the interior of each of the galleries. Network conduits are oriented transverse to the crest and located to each side of the crest. Each network conduit has a sidewall apertured to collect leachate accumulating in the surrounding drainage material and is inclined in general conformity with the saddle-shaped of the stratum thereby to convey the collected leachate towards the lateral side edges of the leachate collection layer. Each network conduit has a discharge end portion extending through the sidewall of at least one of the pair of subsurface galleries for discharge of collected leachate into the interior of the galleries. The network conduits are preferably single elongate conduits extending fully between both galleries and having opposing discharge end portions accessing the interior of each gallery. The galleries are dimensioned to permit passage of the worker along the interior of the galleries to the discharge end portions of the leachate collection conduits, as for purposes of inspection or removal of obstructions. Passages from the surface of the site provide access to the galleries. The contouring of the landfill site and the overall arrangement naturally causes leachate to be shed to either side of the central crest and conveyed laterally to the galleries. Since the galleries curve in conformity with the lateral side edges of the leachate collection layer, the leachate discharged into the galleries tends to travel naturally to locations in the gallery immediately above the lowest point in the stratum, namely, the valley sections, where the leachate can be conveniently removed for disposal. The saddle formation can also be exploited to incline groundwater collection conduits towards a central manifold or groundwater gallery extending between the valleys section, as described more fully below.

Other aspects of the invention will be aparent from a description below of a preferred embodiment and the various aspects of the invention will be more specifically defined in the appended claims.

DESCRIPTION OF THE DRAWINGS

The invention will be better understood with reference to drawings in which:

FIG. 1 is a diagrammatic plan view of the leachate and groundwater collection systems of a landfill site;

FIGS. 2-6 are views along lines of FIG. 1 with corresponding reference numerals and showing various sections of the site;

FIGS. 7 and 8 are views in vertical cross-section showing the landfill site at successive stages of constructions;

FIG. 13 is a cross-sectional view of an assembly of liners, leachate collection layers and the like;

DESCRIPTION OF PREFERRED EMBODIMENTS

Figure 4:
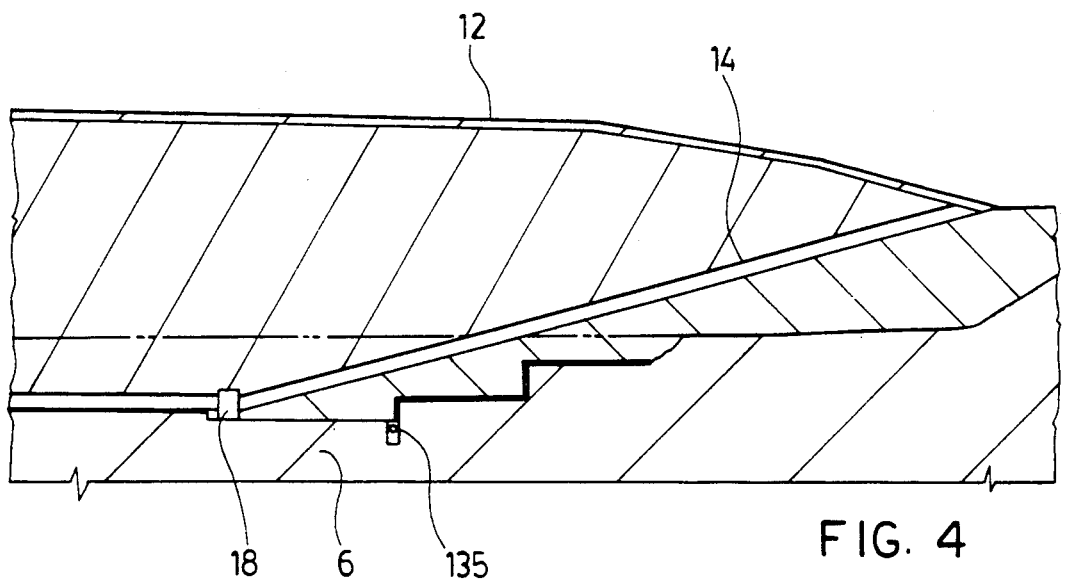
Figure 5:
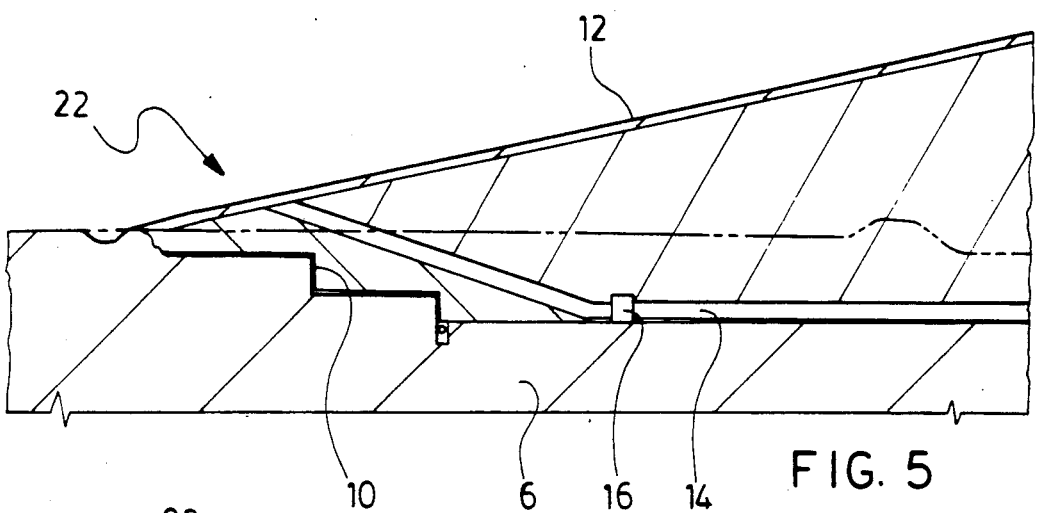
Figure 6:
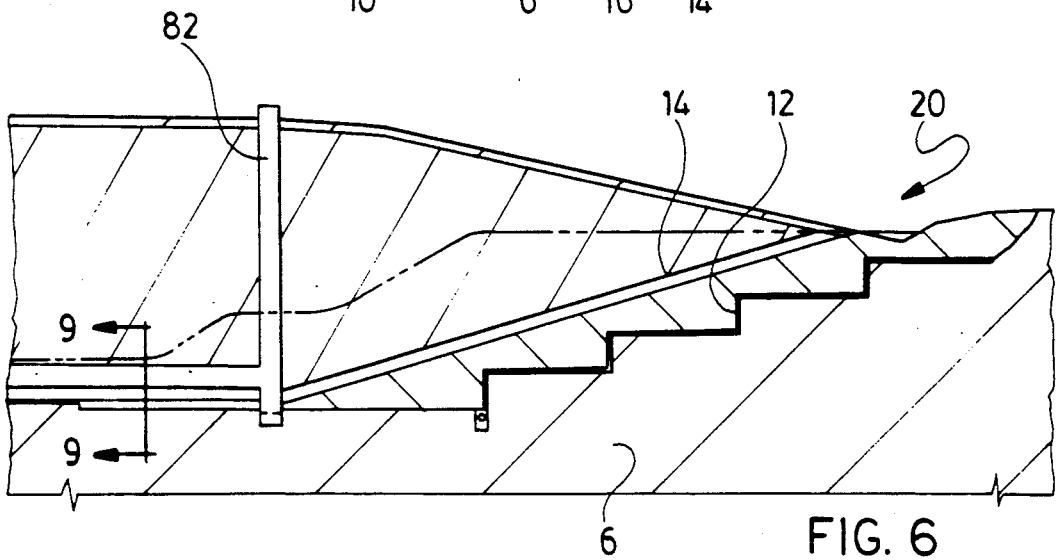

An overview of a landfill site embodying various aspects of the invention will be provided with reference to FIGS. 1-3 and 16. This particular landfill site results from excavation into bedrock 6 and quarrying operations in the bedrock 6. The excavated strata effectively define a generally horizontal subsurface floor 8 (the upper surface of the bedrock 6) and an upwardly inclined subsurface sidewall 10 encircling the perimeter the subsurface floor 8. The exact curvature of the subsurface floor, which has been selected to enhance collection and drainage of leachate from the landfill 12 and also drainage of groundwater rising from the bedrock 6, will be discussed below. An assembly of low-permeability liners and leachate collection layers, collectively indicated with reference numeral 14 in FIGS. 2-3, is formed over the subsurface floor 8 and the subsurface sidewall 10. The assembly 14 collects leachate seeping from the landfill 12 and conveys the leachate to a pair of subsurface galleries 16, 18 for disposal. The general direction of leachate flow to the galleries 16, 18 is indicated with vertical arrows in the view of FIG. 1 above the floor 8. These galleries 16, 18 extend along opposite sides of the quarry floor 8 between forward and rear end portions 20, 22 of the site, effectively along the majority of the perimeter of the quarry floor. Groundwater in the bedrock 6 is collected below the assembly 14 and conveyed to a central groundwater gallery 23 located within the bedrock 6. The direction of groundwater flows, towards the gallery 23, has been indicated with horizontal arrows in the view of FIG. 1. The groundwater is then pumped to a location remote from the site.

Figure 15:
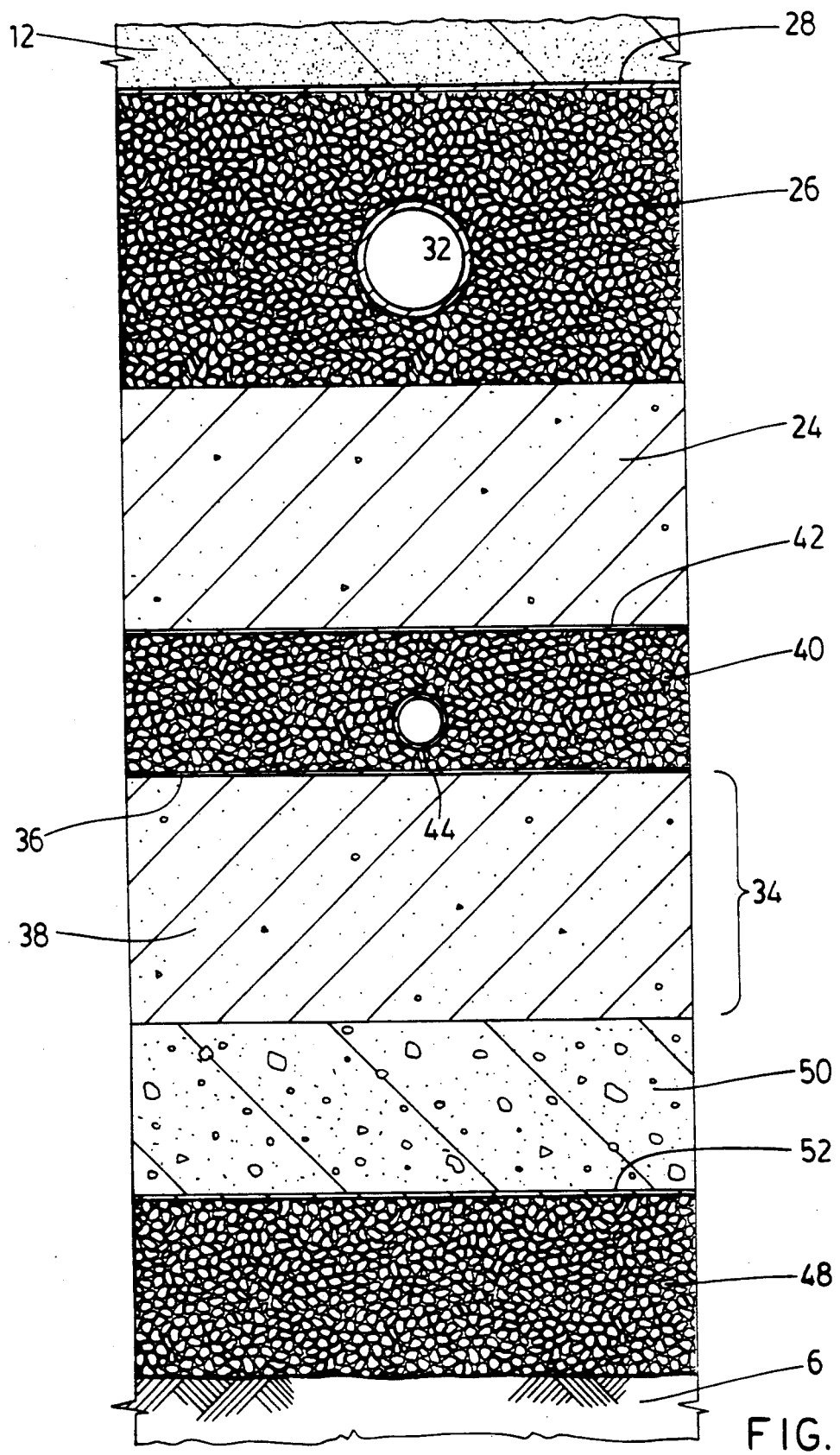
FIG. 15 is a view along the lines 15—15 of FIG. 13 further detailing the assembly of liners and leachate collection layers.
Figure 17:
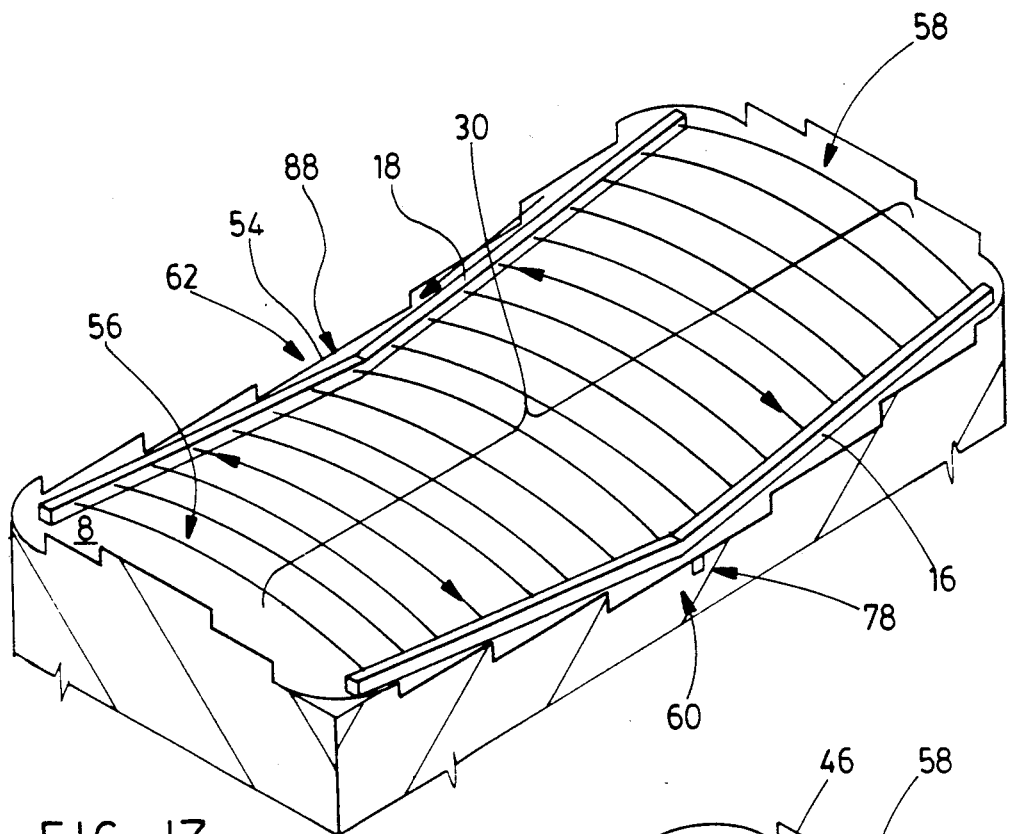
FIG. 17 and 18 are diagrammatic views, respectively, of the leachate and groundwater collection systems of the landfill site.

The assembly 14 will now be described, primarily with reference to FIG. 15. It includes a primary liner 24 formed of compacted clay shale about two feet deep which extends over the area of the subsurface floor 8 and the subsurface sidewall 10. The material has a very low permeability to liquids and serves to impede the passage of leachate from the landfill 12 towards the bedrock 6. A primary leachate collection layer 26, formed of crushed-stone drainage material, is deposited to a depth of about two feet over the primary liner 24. A thin geotextile layer 28 (a synthetic material permeable to water) is laid on the upper surface of the primary leachate collection layer 26 to prevent debris of the overlying landfill 12 from immediately penetrating into the drainage material. Leachate seeping from the landfill 12 is stopped at the primary liner 24 and accumulates in the drainage material of the primary leachate collection layer 24. A network 30 (indicated in FIG. 17) of primary leachate collection conduits, such as the conduit 32 apparent in FIG. 15, are embedded within the drainage material of the primary leachate collection layer 26. These conduits 30 have apertured sidewalls which collect leachate accumulating in the primary leachate collection layer and are oriented to convey the collected leachate to the two subsurface galleries 16, 18.

The liner and collection layer assembly 14 includes a secondary liner 34. The secondary liner 34 extends over both the subsurface floor 8 and subsurface sidewall 10, below the primary liner 24. The secondary liner 34 comprises a high density polyethylene film 36 with a thickness of about 2 millimeters laid over another layer 38 of compacted clay shale. A secondary leachate collection layer 40 of crushed stone drainage material is located between the primary and secondary liners 24, 34. It extends fully over both the subsurface floor 8 and the subsurface sidewall 10. The secondary leachate collection layer 40 is separated from the primary liner 24 by another thin geotextile layer 42. The collection layer 40 accumulates leachate potentially leaked by the primary liner 24 and stopped by the secondary liner 34. Another network of secondary leachate collection conduits, such as the conduit 44 apparent in FIG. 15, are contained within the drainage material of the secondary leachate collection layer 40. These conduits have sidewalls apertured to collect leachate accumulating in the secondary leachate collection layer 40 and are oriented to convey the leachate to the subsurface galleries 16, 18. It should be noted that the secondary leachate collection layer 40 and secondary liner 34 do not collect and convey leachate in normal operation, but serve as a fall-back measure if a significant leak develops in the primary liner 24. They are also instrumental to detection of leaks in the primary liner 24, as explained below.

Figure 18:
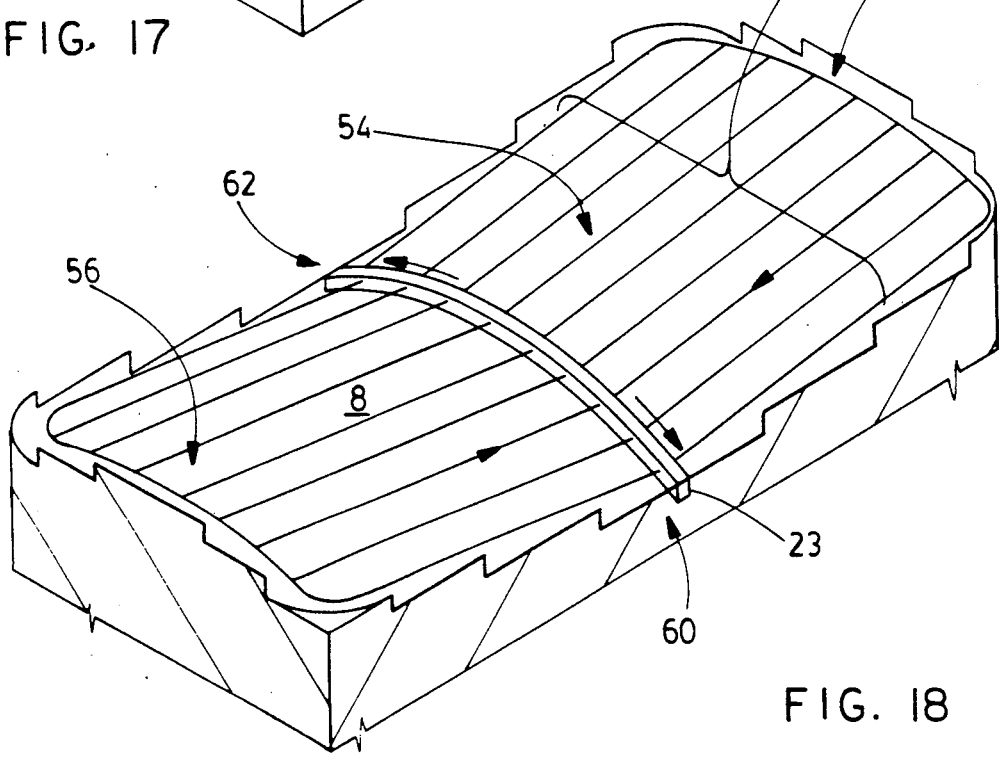

A general description of the groundwater collection system of the site will be provided with reference to FIGS. 1 and 18. The upper surface of the bedrock 6 is formed with blind-ended slots 46 that accumulate groundwater conveyed in crevices and the like of the bedrock 6. The slots 46 extend from either side of the groundwater gallery 23 and are spaced by roughly 50 feet. Conduits in the slots 46 ultimately convey the groundwater to the interior of the groundwater gallery 23 for removal from the site. A layer of crushed stone 48 (see FIG. 15), immediately over the floor 8, permits travel of water horizontally between the slots 46.

Figure 16:
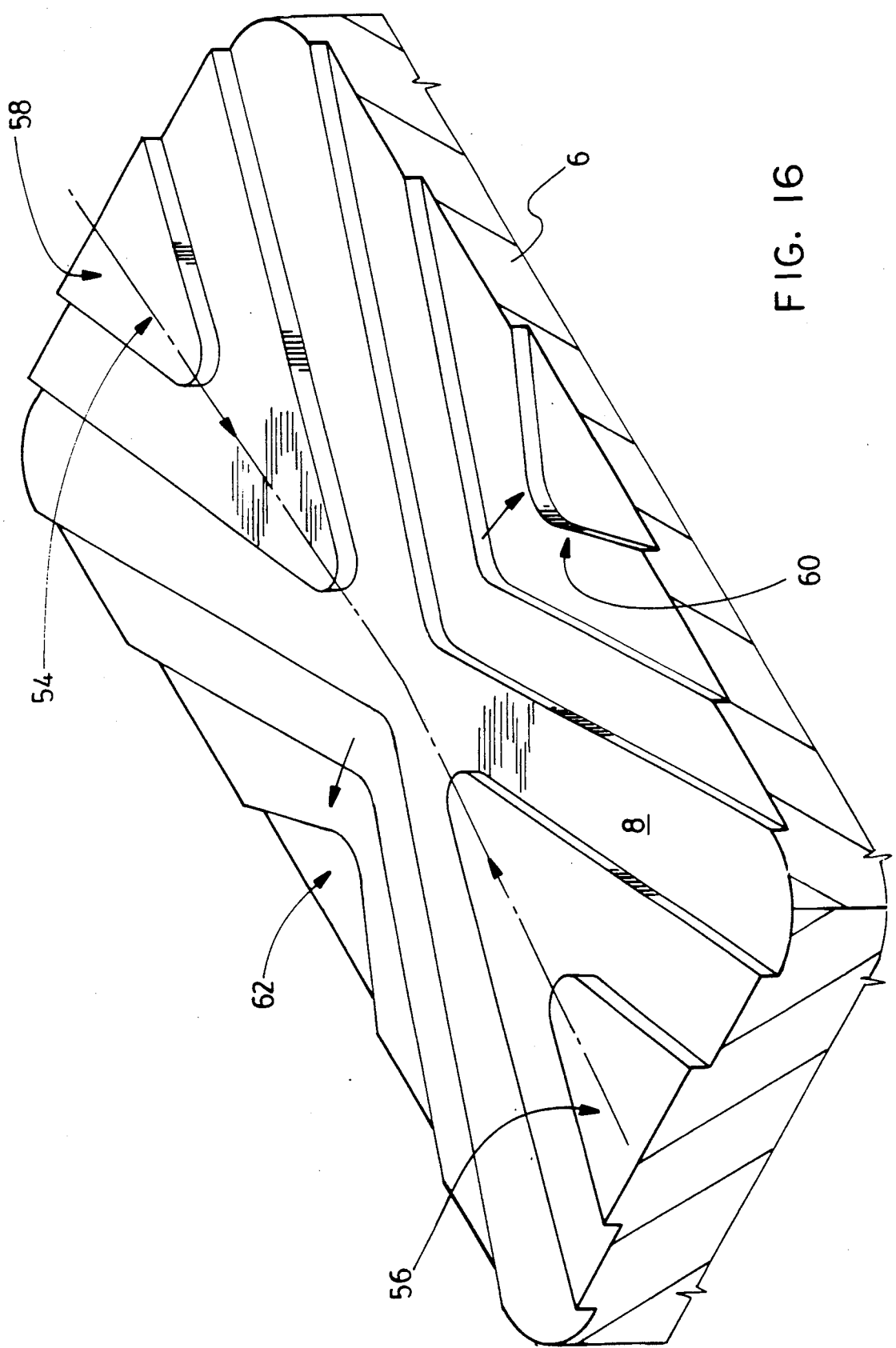
FIG. 16 is a perspective view of the floor of the landfill site.

As apparent in FIG. 16, the floor 8 of the site (the upper surface of the bedrock 6) has been excavated in a step-like manner to impart a saddle shape. The surface is effectively smoothed by the layer 48 of crushed stone and by a grading layer 50 deposited over the crushed stone 48 and separated from the crushed stone by a thin layer of geotexile material 52. The saddle shape has been exaggerated in FIGS. 16-18 to facilitate understanding of the contours of the floor 8. The saddle shape defines a central longitudinal crest 54, a pair of shoulder sections 56, 58 at opposing ends of the crest 54, and a pair of valley sections 60, 62 on opposing sides of the crest 54. The crest 54 represents a high-point in the upper surface in any cross-section taken transverse to the crest 54 itself. In practice, the ratio of rise to run from the bottom-most point of either valley section 60 or 62 to the longitudinal centre of the crest 54 might be about 1:100. The ratio of rise to run from the longitudinal centre of the crest 54 to the top-most point of either shoulder section 56 or 58 might similarly be 1:100. The liners 24, 34 and leachate collection layers 26, 40 have conforming saddle-shapes. This arrangement encourages liquid flows towards the centre of the site and towards the lateral side edges of the two leachate collection layers 26, 40. How this is exploited to enhance collection and conveying of both leachate and groundwater will become apparent below.

Figure 9:
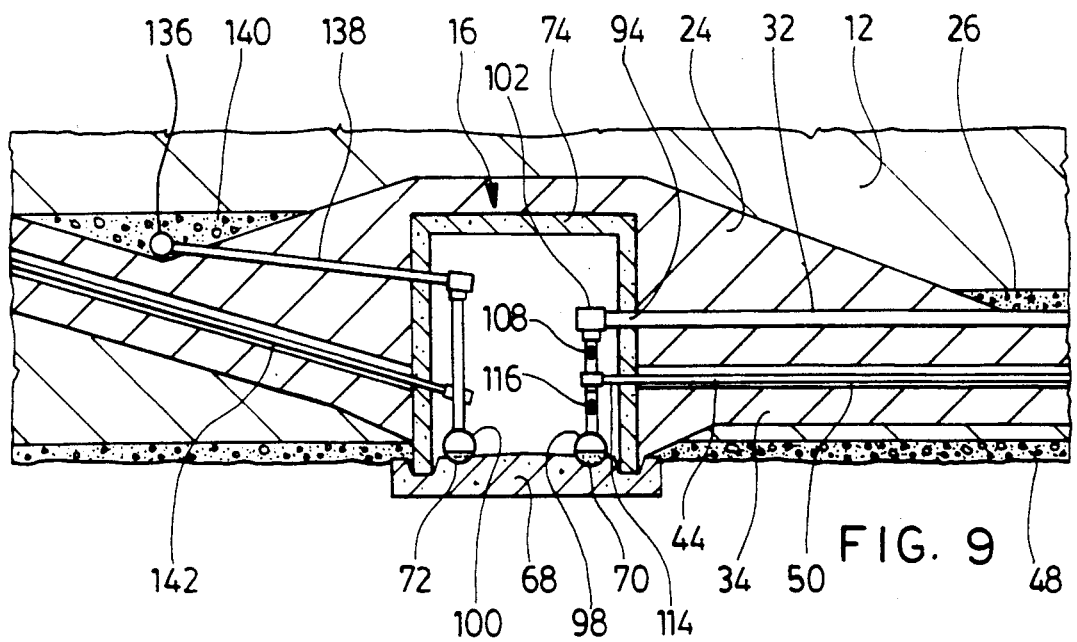
FIG. 9 is a view along lines 9—9 of FIG. 6 show details of a leachate collection gallery and its relationship with primary and secondary leachate collection layers of the landfill site.
Figure 10:
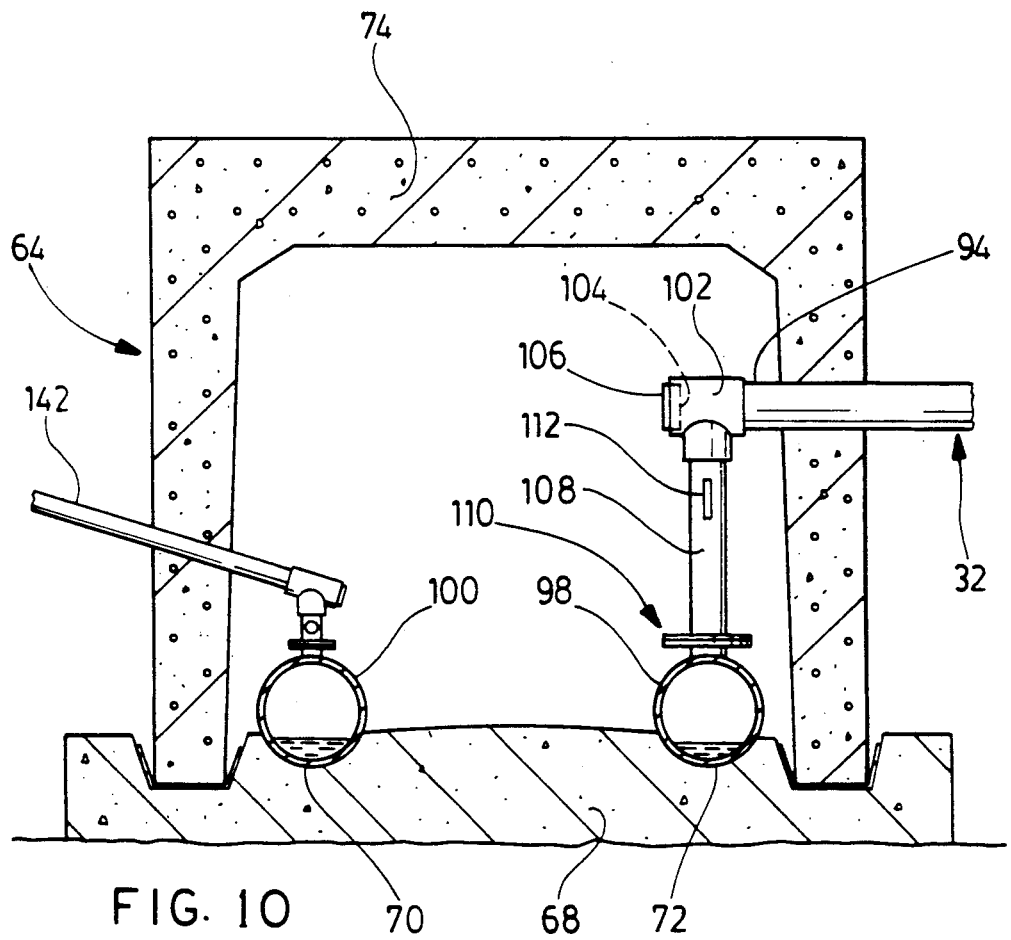
FIG. 10 is an enlarged view similar to that of FIG. 9 but in a cross-section further into the interior of the gallery.
Figure 11:
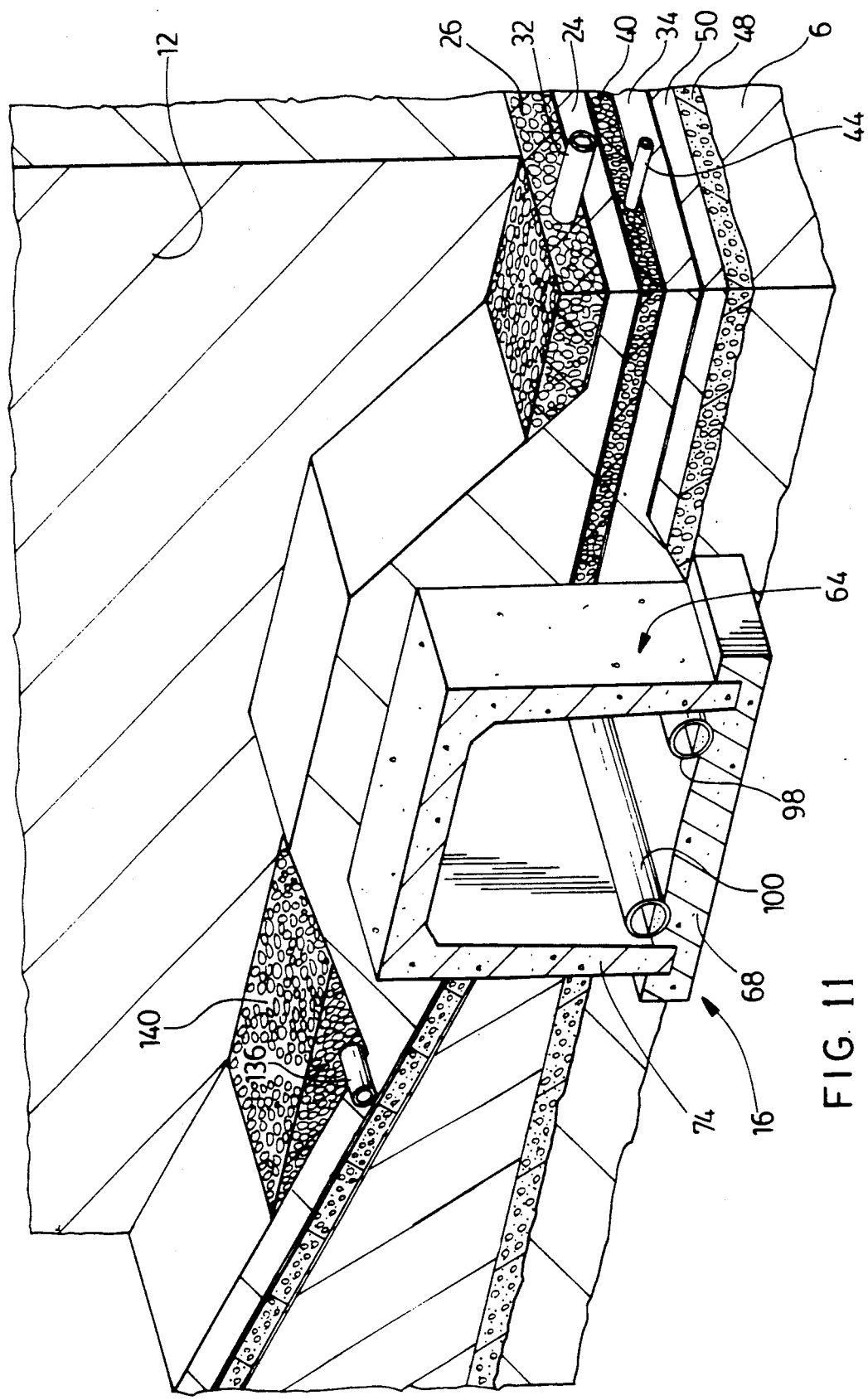
FIG. 11 is a fragmented perspective view of the leachate collection gallery.

The leachate collection gallery 16 is detailed in FIGS. 9-10. The gallery 16 has a circumferential sidewall 64 formed in longitudinal sections of pre-cast reinforced concrete. The term "circumferential" as used in this specification in respect of a gallery sidewall should be understood as indicating that the sidewall completely encircles the interior of the gallery thereby isolating the interior from surrounding regions, but it is not intended to indicate any particular cross-sectional shape. The cross-sectional dimensions of the gallery 16 are roughly 10 feet square, readily permitting passage of a worker and equipment along the gallery 16. The gallery sidewall 64 comprises a base 68 formed with a pair of semi-circular longitudinal troughs 70, 72. It also comprises a U-shaped cap 74 which seats in recesses formed in the base 68, the seating surfaces being sealed with neoprene or other appropriate materials (not illustrated).

The gallery 16 extends along one lateral side edge of the leachate collection layer 26. The gallery 16 curves in conformity with that lateral side edge (as apparent in FIG. 17 where the conduits of the primary leachate collection layer 26 have been shown) and consequently has a low-point 78 above the valley section 60 of the bedrock 6. At the rear portion 22 of the site, a passage 80 (indicated in FIG. 1) extends upward from the gallery 16 to the surface of the site to permit worker and equipment access. At the forward portion 20 of the site, a similar passage 82 (indicated in FIG. 1) communicates with the interior of the gallery 16. This is provided primarily to permit venting of the interior of the gallery 16 with a conventional fan unit (not illustrated). The passages 80, 82 may be formed in a conventional manner of reinforced concrete. The other gallery 18 has a similar construction and communicates with the surface of the site through passages 84, 86. It extends along and curves in conformity with the opposite lateral side edge of the primary leachate collection layer 26 and consequently has a low-point 88 above the other valley section 62. Pump-operated sumps 90, 92 (diagrammatically illustrated in FIG. 1) proximate to the valley sections 60, 62 communicate with the interiors of the galleries 16, 18 at their low-points 78, 88 to receive leachate for pumping to a remote disposal site.

The primary leachate collection layer 26 will now be described in greater detail, primarily with reference to FIGS. 9-11 and 17. Its leachate collection conduits 30 are oriented transverse to the crest 54 and to either side of the crest 54, as apparent in FIG. 17. These conduits 30 are inclined in general conformity with the saddle-shape of the bedrock 6 such that leachate collected in the conduits tends to travel towards the lateral edges of the primary leachate collection layer 26 where the galleries 16, 18 are located. The conduit 32 is typical. It has a discharge end portion 94 which extends through the circumferential sidewall 64 of the gallery 16 to discharge leachate into the interior of the galley 16. The opposing end portion is placed in fluid communication with the interior of the other gallery 18 in a similar manner. The saddle-shape of the primary liner 24 also encourages more complete drainage of leachate. Leachate in the drainage material themselves tends to travel to the lateral edges of the primary leachate collection layer 26 where it wells about the primary collection conduits 30 and can readily be collected by the perforated sidewalls of the conduits 30. Once the leachate is in the galleries 16, 18, conformity of the galleries 16, 18 to the lateral side edges of the primary leachate collection layer 26 and consequently the valley sections 60, 62 of the bedrock 6 encourages the leachate to flow to the low-points 78, 88 in the galleries 16, 18. The secondary leachate collection layer 40 and its network of leachate collection conduits is similarly configured and will not be described.

Leachate may be allowed to flow openly through the leachate galleries 16, 18. The troughs provided in the base of the galleries 16, 18 can be used to confine the flows. A worker may enter the galleries 16 18 at the passage 80, 84 formed at the rear end portion 22 of the site. The discharge end portions may thus be fully exposed and freely accessible to the worker for inspection of leachate flows and for removal of obstruction. Free flow of leachate through the galleries 16, 18 is not a preferred arrangement and consequently has not been illustrated.

To reduce exposure of a worker to gases emanating from the leachate, the discharge end portions of the primary leachate collection conduits 30 are connected to disposal conduits in the interiors of each of the galleries 16, 18. A pair of disposal conduits 98, 100 in the gallery 16 are typical of this arrangement and are apparent in FIGS. 9-10. These conduits 98, 100 serve as manifolds to receive collected leachate. The disposal conduits 98, 100 runs the full length of the gallery 16 in the troughs 70, 72 and follows the general curvature of the gallery 16 into its low-point 78 at the valley section 60.

The sump 90 at this location is coupled to the conduits 98, 100 and can be isolated from the gallery 16 to reduce gases accumulation in the interior of the gallery 16. The other leachate collection gallery 18 comprises similar disposal conduits.

The juction between the discharge end portion 94 of the primary leachate collection conduits 32 and the disposal conduit 98 is detailed in FIGS. 9-10. A conventional threaded T-connector 102 is secured to the discharge end portion 94. One threaded opening 104 of the T-connector 102, concentric and in-line with the conduit, receives a threaded plug 106. An upright conduit 108 threaded into a lower opening of the T-connector 102 is secured with paired flanges 110, bolts (not illustrated) and a short length of pipe to the disposal conduit 98, in a conventional manner. This arrangement provides a flow path between the discharge end portion 94 of the leachate collection conduit 32 and the disposal conduit 98, which is closed to air in the interior of the gallery 16. A site glass 112 formed in the upright conduit 108 gives a visual indication of leachate flows. Since the threaded opening 104 is in-line with the discharge end portion 94, removal of the plug 106 with an appropriate wrench permits introduction of a powered snake in-line with the conduit, if visual inspection through the site glass 112 indicates a potential blockage. As apparent in FIG. 9, the discharge end portion 114 of the secondary leachate collection conduit 44 is similarly, but separately, connected to the disposal conduit 98. It is also provided with a site glass 116 that indicates visually any secondary leachate flows arising from leaking of the primary liner 24. With this arrangement, the end portions of the leachate collection conduits of both the primary and secondary leachate collection layers 26, 40 remain accessible for detection of leachate flows and removal of obstructions, but a better environment is provided in the interior of the galleries 16, 18.

Presence of unanticipatedly high leachate flows in the secondary leachate collection conduits is a strong indicator of a leak in the primary liner 24. Observing which secondary leachate collection conduits are conveying leachate gives an indication of the general area where the leak has occurred. This permits more precise drilling or excavation to correct the failure. In the meantime, leachate leaked from the primary liner 24 is still contained by the secondary liner 34.

Figure 12:
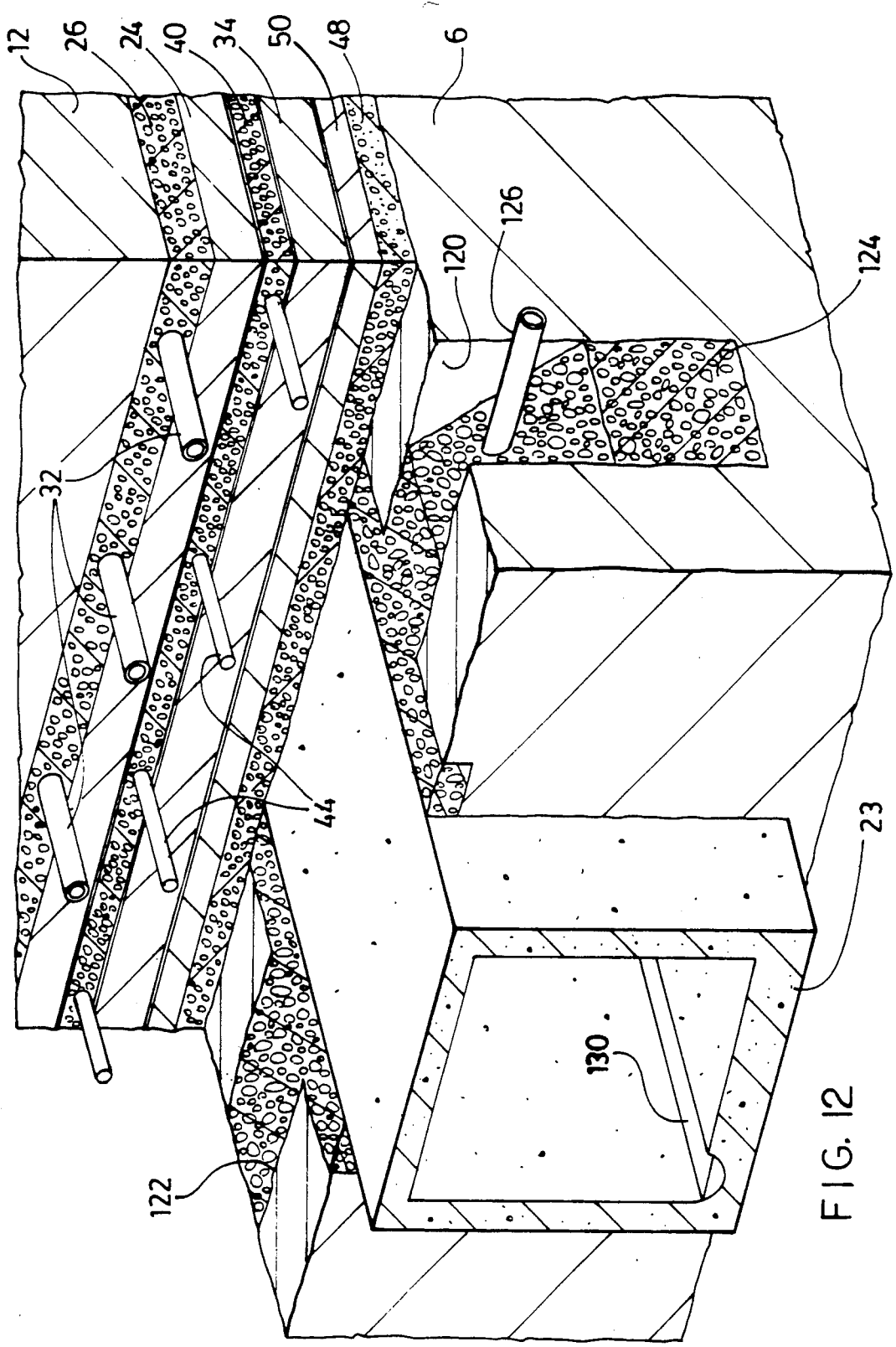
FIG. 12 is a fragmented perspective view of a groundwater collection gallery.
Figure 13:
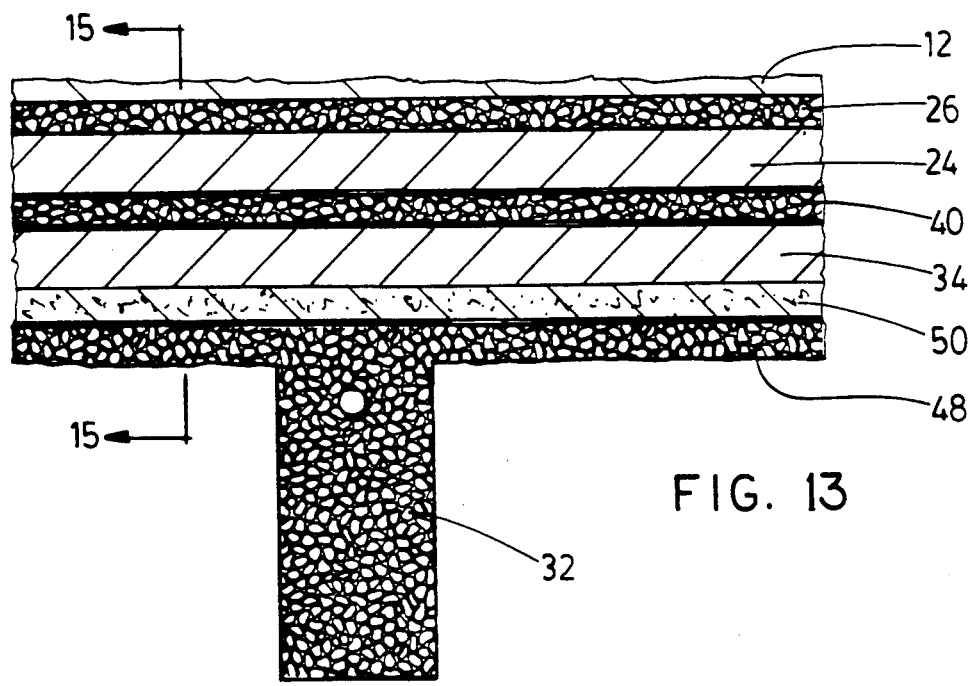
Figure 14:
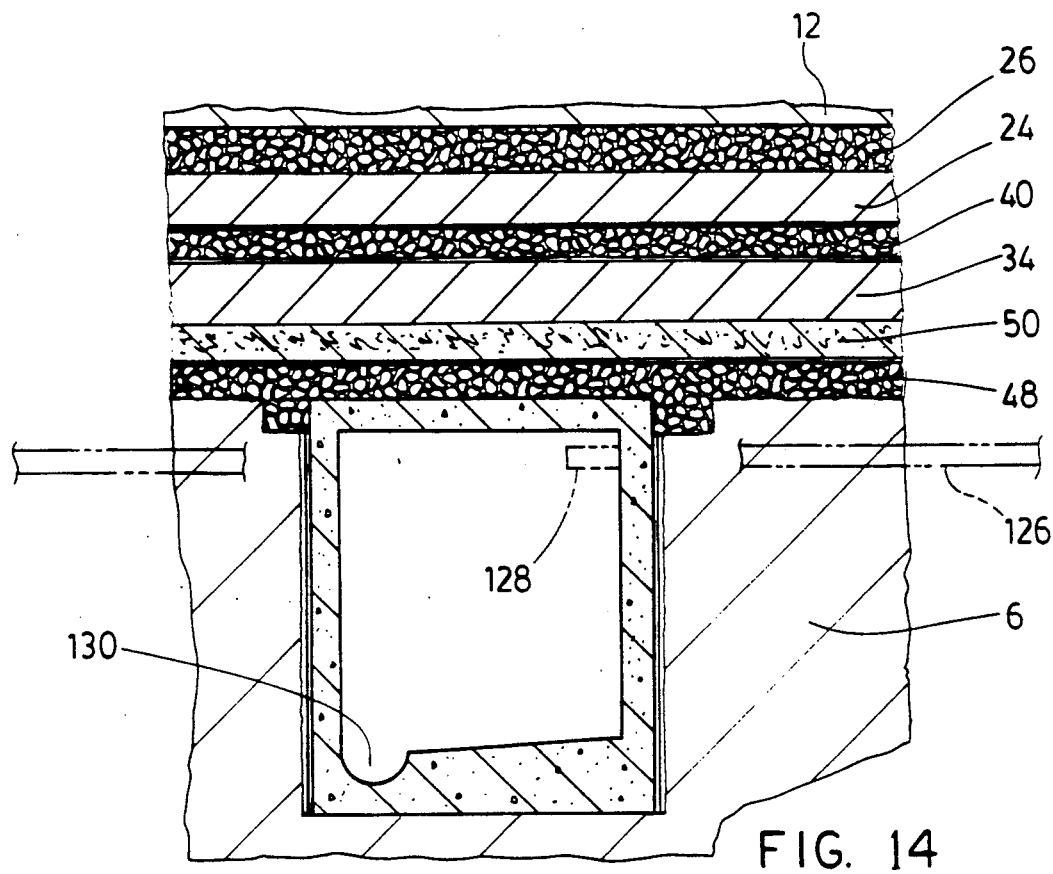
FIG. 14 is a cross-sectional view further illustrating the groundwater gallery.

The groundwater gallery 23 is further detailed in the views of FIGS. 12 and 14. Although diagrammatically shown with a unitary construction, the groundwater gallery 23 will typically have a base and cap construction similar to that of the galleries 16, 18. The groundwater gallery 23 is oriented transverse to the central longitudinal crest 54 and extends between the pair of valley sections 60, 62 following the general contours and curving of the saddle-shape. This, however, is not as significant with respect to the groundwater gallery 23 as with respect to the various liners, leachate collection layers, and slots. A passage 118 accessible at the surface of the land site permits a worker to enter the groundwater gallery 23 for purpose of inspection.

Two slots 120, 122 of the slots 46 formed in the upper surface of the bedrock 6 are apparent in FIG. 12. These extend transversely away from opposite sides of the sidewall of the groundwater gallery 23. The slot 120, which is typical, has a depth of about 10 feet and a width of about 5 feet. It is filled with crushed stone drainage material 124. A groundwater collection conduit 126 is contained within the drainage material 124 spaced a predetermined distance from the bottom of the slot 120. The groundwater collection conduit 126 with its apertured sidewall collects any groundwater accumulating to a predetermined depth within the drainage material 124 of the slot 120. It is oriented to convey the collected groundwater to the groundwater gallery 23. The groundwater collection conduit 126 has a discharge end portion 128 extending through the sidewall of the groundwater gallery 23 into its interior.

It will be noted that the slot 120 extends transversely from the sidewall of the groundwater gallery 23. It is consequently oriented in the same direction as and has the same general inclination as the crest 54. The saddle-shape imparted to the bedrock 6 and to the various liners and layers over the subsurface floor 8 consequently encourages groundwater in the slot 120 (and in all slots 46) to flow towards the groundwater gallery 23 and to rise proximate to the groundwater gallery 23 to a height at which the associated groundwater collection conduits can receive the water. Since the groundwater gallery 23 follows the curvature of the saddle-shaped upper surface between the valley sections 60, 62, water received in the groundwater gallery 23 is shed to either end of the groundwater gallery 23. The floor of the gallery 23 may be inclined towards a lengthwise trough 130 formed in the base of the groundwater gallery 23 to leave the floor 8 largely clear of water for workmen. No disposal conduit is used. Pump-operated sumps 132, 134 (illustrated diagrammatically in FIG. 1) at either end of the groundwater gallery 23 adjacent to the valley sections 60, 62 are used to pump the groundwater to a reservoir or the like.

An additional slot 135 extends in a closed circuit around the perimeter of the quarry floor 8. The slot 135 is apparent in cross-section in FIGS. 2-6. The general configuration of the slot 135 is substantially identical to that of the slot 120. It also has a groundwater collection conduit (not specifically indicated) that extends into the interior of the groundwater gallery 23. This arrangement provide additional collection of water at the foot of the subsurface sidewall 10.

The arrangement for collecting groundwater provides a number of advantages. As mentioned above, it relieves parts of the upward hydrostatic pressure on liners and seals, which may not otherwise be adequately balanced from above owing to collection of leachate. Ideally, however, a measure of leachate. A very inportant advantages is that stresses tending to cause the bedrock 6 to have are relieved by the slots 46.

The subsurface sidewall 10 defined by the strata is inclined more steeply than the saddle-shaped floor 8. The primary and secondary liners extends over the subsurface sidewall 10 (as apparent in FIG. 9) to prevent escape of leachate at all points in the site. The inclination of the subsurface sidewall 10 induces leachate flows strongly towards the gallery structures at the perimeter of the floor 8. For that reason, the primary leachate collection layer 26 (interrupted at the galleries 16, 18) has not been extended fully over the subsurface sidewall 10. Apertured collection conduits need not be oriented transverse to the gallery sidewall 64 in this area, but may simply be formed with a right-angled discharge portions that lead into the interior of the gallery 16. A collection conduit 136 with a right-angled discharge end portion 138 (see FIG. 9), located in a portion 140 of the primary leachate collection layer 26 radially outwardly of the gallery 16, is typical of this arrangement. Alternatively, the primary liner 24 which extends over the gallery 16 may be configured to direct such leachate flows of the region above the subsurface floor 8 for collection in that area.

Although interrupted at the galleries 16, 18, the secondary leachate collection layer 40 extends fully over the subsurface sidewall 10. Certain of the conduits of the secondary leachate collection layer 40, such as the conduit 142 in FIG. 9, extend radially away from the gallery 16, upwardly along the subsurface sidewall 10. These conduits are spaced apart about the perimeter of the floor 8. The object is to detect possible leakage of the primary liner 24 in the area above the subsurface sidewall 10. That is done, once again, by visual inspection of leachate flows in the secondary leachate collection conduits, particularly in conduits such as the conduit 142.

The configuration of the leachate and groundwater collection systems permits their continual expansion in a selected direction along the site. This permits excavation and quarraying in the forward portion 20 of the site and simultaneous landfill operations in the rear portion 22. In general terms, the site and systems may be progressively developed as follows. Initial excavation is performed to the bedrock 6 and initial quarrying in the bedrock 6 is commenced. Once the cavity is sufficiently large, sections of leachate galleries 16, 18 are laid on the bedrock 6 and passages 80, 84 are formed leading from the surface to the galleries 16, 18. Disposal conduits 98, 100 may be assembled in the galleries 16, 18. Spaced-apart slots 46 are formed in the bedrock 6 generally in the direction in which the side is to be expanded. These are filled with crushed stone in which the relevant groundwater drainage conduits are installed in sections and buried. The layer 48 of crushed stone is deposited over the upper surface of the bedrock 6 and the grading layer 50 to even the otherwise step-like shape. The secondary liner 34 may then be deposited on the gravel and extended to the galleries 16, 18. The secondary leachate collection layer 40 is then deposited and the secondary leachate collection conduits 30 are laid down. Discharge end portions of the secondary collection conduits 30 are extended through the gallery sidewalls and connected to the relevant disposal conduits. Thereafter they are buried with additional drainage material. The geotextile layer is then laid down over the drainage material of the secondary leachate drainage layer. The primary liner 24 is then deposited. The primary leachate collection layer 26 may then be deposited together with its conduits which are appropriately extended through the gallery sidewalls, connected to the disposal conduits and appropriately buried with additional drainage material. A layer of geotextile material is then laid over the primary leachate collection layer 26 to prepare for receipt of landfill 12. The sides of the site receive similar treatment except that the primary leachate collection layer 26 is extended only partially over the subsurface sidewall 10 and the primary collection conduits in this region are circumferentially, rather than radially, oriented relative to the floor 8. Landfill may be deposited in a conventional manner, filling the rear portion 22 of the site in a step-like manner as apparent in FIG. 7.

Excavation and quarrying may continue in the forward portion 20 of the site, observing the saddle-shape required for the floor 8. A dirt toe dam 144 may be formed on the assembly 14 to trap leachate seeping from the landfill 12 on a temporary basis. This leachate may be pumped to a disposal vehicle and treated in an appropriate manner. The galleries 16, 18 may be similarly cleared of any accumulating leachate. Groundwater accumulating in front of the dam 144 may be similarly removed. The groundwater slots 46, the galleries 16, 18, and the assembly 14 may be extended from time-to-time in response to the quarrying and filling operations, basically following the steps described above. The toe dam 144 will of course be moved forward as required.

Eventually, the longitudinal mid-point of the expected landfill site will be reached. A cavity may be cut transverse to the direction in which the site is expanding. The groundwater gallery 23 may then be formed in this cavity, as apparent in FIG. 8, and connected to appropriate sumps 132, 134. Sumps 90, 92 may also be installed for collection removal of leachate from the disposal conduits in the galleries 16, 18. The various sumps may thereafter be put into continuous operations. The connecting passage 118 may also be formed from the expected surface of the site to the groundwater gallery 23. Slots formed in the bedrock 6 at the rear portion 22 of the site are now finished, and their contained conduits extended through the sidewall of the groundwater gallery 23. Fresh slots are commenced on the opposite side of the groundwater gallery 23 and their drainage conduits are installed and extended through the gallery sidewall. The leachate and groundwater collection systems are thereafter extended in substantially the manner described above until excavation and quarrying are complete. Concrete structures may then be assembled at the forward end 20 of the site to define the passages 82, 86 leading from the surface to the forward ends of the galleries 16, 18. The inclined subsurface sidewall 10 is finished at the forward portion 20 of the site with liners, collection layers and other various conduits, substantially in the manner described above. Landfill operations can then proceed until the site is completely covered. It will be apparent to those skilled in the art that the construction costs of the landfill site, regardless of exact configuration, will be considerably lower than those of the prior system proposed in the Grund patent.

The completed landfill site may be operated and closely monitored for several years. Leachate samples will be taken from time-to-time to determine when the site has stabilized, producing no significant quantity of contaminants. Leachate flows will be regularly inspected to detect blockages of primary leachate collection conduits 30 and possible leaks in the primary liner 24. Once stable, inspection and maintenance operations may be discontinued, leachate and groundwater pumping may be discontinued, and access passages to the galleries may be sealed.

It will be appreciated that a particular embodiment of the invention has been described and that modifications may be made therein without departing from the spirit of the invention or necessarily departing from the scope of the appended claims.

I claim:

1. A landfill site adapted to collect and permit inspection of leachate flows from landfill deposited over a subjacent stratum, comprising:
   a leachate collection layer formed of drainage material, the leachate collection layer being located below the landfill and being continually in communication with the landfill to receive leachate flows from the landfill created by rainfall on the site;
   a liner formed of materials impeding passage of liquids, the liner being located above the stratum and located below and proximate to the leachate collection layer such that the received leachate flows accumulate in the leachate collection layer;
   an elongate subsurface gallery in a generally horizontal orientation, the gallery comprising a circumferential sidewall defining the interior of the gallery, the sidewall being dimensioned to premit passage of a worker along the interior of the gallery;
   means defining a passage accessible at the surface of the landfill site and permitting a worker to enter the subsurface gallery; and,
   a multiplicity of horizontally spaced-apart leachate collection conduits contained within the drainage material of the leachate collection layer, each of the leachate collection conduits having a sidewall apertured to collect leachate accumulating in the leachate collection layer and being oriented to convey the collected leachate along the leachate collection layer to the gallery;
   each of the leachate collection conduits having a discharge end portion extending through the gallery sidewall, the discharge end portions of the leachate collection conduits being horizontally spaced-apart from one another along the majority of the length of the subsurface gallery, the discharge end portions being accessible from the interior of the gallery such that day-to-day leachate flows from the landfill can be monitored and the leachate collection conduits can be cleared of obstructions by the worker directly from the interior of the gallery.

2. The landfill site of claim 1 comprising:
   a disposal conduit extending along the interior of the gallery and oriented to convey leachate received by the disposal conduit to a predetermined disposal location; and,
   means forming a multiplicity of junctions between the disposal conduit and the leachate collection conduits, each of the junctions being associated with a different one of the leachate collection conduits and defining a flow passage closed to air in the interior of the gallery and oriented to convey leachate from the discharge end portion of the associated leachate collection conduit to the interior of the disposal conduit.

3. The landfill site of claim 2 in which each of the junctions comprises:
   an opening accessing the interior of the associated leachate collection conduit;
   a closure member configured to close the opening;
   means for releasably seating the closure member over the opening.

4. The landfill site of claim 3 in which the opening of each of the junctions is axially aligned with the discharge end portion of the associated leachate collection conduit.

5. The landfill site of claim 1 in which the subjacent stratum carries groundwater and in which the landfill site is adapted to collect groundwater from the subjacent stratum, comprising:
   an elongate groundwater gallery located below the liner, the groundwater gallery having a circumferential sidewall and an interior defined by the sidewall;
   means defining a passage accessible at the surface of the landfill site and permitting a worker to enter the groundwater gallery;

a multiplicity of spaced-apart groundwater collection conduits located within the subjacent stratum, each of the groundwater collection conduits having a sidewall apertured to collect groundwater accumulating in the subjacent stratum, each of the groundwater collection conduits having a discharge end portion extending through the sidewall of the groundwater gallery into the interior of the gallery for discharge of the collected groundwater into the interior of the gallery.

6. The landfill site of claim 1 in which the subjacent stratum is bedrock that carries groundwater and in which the landfill site is adapted to collect groundwater from the bedrock, comprising:
   a groundwater manifold configured to convey groundwater received by the manifold to a predetermined disposal location;
   a multiplicity of generally horizontal blind-ended slots formed in the upper surface of the bedrock and filled with drainage material;
   a multiplicity of groundwater collection conduits each associated with a different one of the slots and contained within the drainage material filling the associated slot;
   each of the groundwater collection conduits having a sidewall apertured to collect groundwater accumulating within the associated slot and being oriented to convey the collected groundwater to a discharge end portion of the groundwater collection conduit, the groundwater discharge end portion communicating with the groundwater manifold for discharge of collected groundwater into the manifold.

7. The landfill site of claim 1 in which the subjacent stratum is bedrock that carries groundwater and in which the landfill site is adapted to collect groundwater from the subjacent stratum, comprising:
   an elongate groundwater gallery located below the liner, the groundwater gallery having a circumferential sidewall and an interior defined by its sidewall;
   means defining a passage accessible at the surface of the landfill site and permitting a worker to enter the subsurface gallery;
   a multiplicity of slots formed in an upper surface of the bedrock and extending away from the sidewall of the groundwater gallery, each of the slots being filled with drainage material;
   a multiplicity of groundwater collection conduits each associated with a different one of the slots and contained within the drainage material filling the associated slot, each of the groundwater collection conduits having a sidewall apertured to collect groundwater accumulating within the drainage material of the associated slot and oriented to convey the collected groundwater to the groundwater gallery;
   each of the groundwater collection conduits having a discharge end portion extending through the sidewall of the groundwater gallery into the interior of the groundwater gallery, the groundwater gallery being dimensioned to permit passage of the worker along the interior of the gallery to the discharge end portions of the groundwater collection conduits.

8. The landfill site of claim 1 adapted to accommodate failure of the liner and permit detection of attendant leaking of leachate downwardly through the liner, comprising:
   a second leachate collection layer formed of drainage material and located below the liner;
   a second liner formed of materials impeding passage of liquids and located immediately below the second leachate collection layer such that the leaked leachate accumulates in the second leachate collection layer;
   a second multiplicity of horizontally spaced-apart leachate collection conduits contained within the drainage material of the second leachate collection layer, each of the second multiplicity of leachate collection conduits having a sidewall apertured to collect the leaked leachate accumulating in the drainage material of the second leachate collection layer and being oriented to convey the collected leachate along the second leachate collection layer to the gallery, each of the second multiplicity of leachate collection conduits having a discharge end portion extending through the gallery sidewall and accessible from the interior of the gallery at least for detection of leachate flows in the leachate collection conduit.

9. The landfill site of claim 8 comprising means forming a second multiplicity of junctions between the disposal conduit and the second multiplicity of leachate collection conduits, each of the second multiplicity of junctions being associated with a different one of the second multiplicity of leachate collection conduits and defining a flow passage closed to air in the interior of the gallery and oriented to convey leachate from the discharge end portion of the associated leachate collection conduit to the interior of the disposal conduit.

10. The landfill site of claim 9 comprising a multiplicity of means for indicating flow of leachate from the discharge end portion of each of the secondary multiplicity of leachate collection conduits into the disposal conduit.

11. A landfill site adapted to collect and permit inspection of leachate flows from landfill created by rainfall on the site, comprising:
   a stratum beneath the landfill defining a generally horizontal subsurface floor and an upwardly inclined subsurface sidewall extending around the subsurface floor, the stratum having a generally saddle-shaped upper surface defining the majority of the subsurface floor, the upper surface comprising a central concave longitudinal crest, a pair of shoulder sections at opposing ends of the crest, and a pair of concave valley sections on opposing sides of the crest;
   a leachate collection layer formed of drainage material, the leachate collection layer being located between the stratum and the landfill and being continually in communication with the landfill to receive the leachate flows from the landfill created by rainfall on the site, the leachate collection layer having a saddle-shape conforming to the saddle-shaped upper surface of the stratum with a pair of lateral side edges one to either side of the central longitudinal crest of the stratum;
   a liner formed of materials impeding passage of liquids, the liner being located above the stratum and being located below and proximate to the leachate collection layer such that the received leachate flows accumulate in the leachate collection layer, the liner having a saddle-shape conforming to the saddle-shaped upper surface of the stratum;

a pair of elongate subsurface galleries extending along and curving in conformity each with a different one of the lateral side edges of the leachate collection layer such that each of the galleries has a substantially central, relative low point proximate to a different one of the valley sections, each of the subsurface galleries having a circumferential sidewall and an interior defined by its sidewall, each of the circumferential sidewalls being dimensioned to permit passage of a worker along the interior of the associated gallery;

means communicating with each of the galleries at the relative low point of the gallery to discharge leachate conveyed by the gallery to its relative low point;

means defining passages permitting a worker to access the pair of galleries from the surface of the landfill site;

a network of leachate collection conduits, the network being contained within the drainage material of the leachate collection layer and being in fluid communication with the interior of each of the galleries, the network conduits being oriented transverse to the crest and located to each side of the crest, each of the network conduits having a sidewall apertured to collect leachate accumulating in the drainage material of the leachate collection layer and being inclined in general conformity with the saddle-shape of the stratum thereby to convey the collected leachate towards the lateral side edges of the leachate collection layer, each of the network conduits having a discharge end portion extending through the sidewall of at least one of the pair of subsurface galleries for discharge of collected leachate into the interior of the galleries, the discharge end portions being accessible from the interiors of the galleries such that day-to-day leachate flows from the landfill can be monitored and the leachate collection conduits can be cleared of obstructions by the worker directly from the interior of the gallery.

12. The landfill site of claim 11 in which each of the galleries comprises:

a disposal conduit extending along the interior of the gallery and generally following the curvature of the one of the lateral side edges of the leachate collection layer along which the gallery extends; and, means forming a multiplicity of junctions between the disposal conduit and the leachate collection conduits, each of the junctions being associated with a different one of the leachate collection conduits and defining a flow passage closed to air in the interior of the gallery and oriented to convey leachate from the discharge end portion of the associated leachate collection conduit to the interior of the disposal conduit;

the means communicating with the gallery at the relative low point of the gallery to discharge leachate are coupled to the disposal conduit.

13. The landfill site of claim 11 in which the stratum is bedrock that carries groundwater and in which the landfill site is adapted to collect groundwater from the stratum, comprising:

a groundwater manifold within the stratum and extending transversely relative to the central crest between the pair of valleys;

a multiplicity of horizontally spaced-apart blind-ended slots formed in the upper surface of the bedrock to either side of the groundwater manifold, each of the slots being substantially aligned with the general direction of the crest, each of the slots being filled with drainage material;

a multiplicity of groundwater collection conduits each associated with a different one of the slots and contained within the drainage material filling the associated slot;

each of the groundwater collection conduits having a sidewall apertured to collect groundwater accumulating within the associated slot and being oriented to convey the collected groundwater to a discharge end portion of the groundwater collection conduit, the groundwater discharge end portion communicating with the groundwater manifold for discharge of collected groundwater into the manifold.

14. The landfill site of claim 13 in which the subjacent stratum is bedrock that carries groundwater and in which the landfill site is adapted to collect groundwater from the subjacent stratum, comprising:

an elongate groundwater gallery located below the liner within the bedrock, the groundwater gallery having a circumferential sidewall and an interior defined by its sidewall, the groundwater gallery being oriented transverse to the central longitudinal crest and extending between the pair of valleys;

means defining a passage accessible at the surface of the landfill site and permitting a worker to enter the groundwater gallery;

a multiplicity of slots formed in an upper surface of the bedrock and extending transversely away from opposite sides of the sidewall of the groundwater gallery, each of the slots being filled with drainage material;

a multiplicity of groundwater collection conduits each associated with a different one of the slots, each groundwater collection conduit being contained within the drainage material filling the associated slot;

each of the groundwater collection conduits having a sidewall apertured to collect groundwater accumulating within the drainage material of the associated slot and oriented to convey the collected groundwater to the groundwater gallery;

each of the groundwater collection conduits having a discharge end portion extending through the sidewall of the groundwater gallery into the interior of the groundwater gallery, the groundwater gallery being dimensioned to permit passage of the worker along the interior of the gallery to the discharge end portions of the groundwater collection conduits.

15. A landfill site adapted to collect leachate from landfill deposited over strata that define a generally horizontal subsurface floor and an upwardly inclined subsurface sidewall extending around the perimeter of the subsurface floor, comprising:

a primary leachate collection layer formed of drainage material, the primary leachate collection layer being located between the strata and the landfill and overlaying at least the subsurface floor, the primary leachate collection layer communicating continually with the landfill to receive leachate flows from the landfill created by rainfall on the site;

a primary liner formed of materials preventing passage of liquids, the primary liner overlaying the subsurface floor and the subsurface sidewall, the primary liner being located below the primary leachate collection layer such that the received leachate flows accumulate in the primary leachate collection layer;

a network of horizontally spaced-apart primary leachate collection conduits contained within the drainage material of the primary leachate collection layer and located at least overlaying the subsurface floor;

a secondary leachate collection layer formed of drainage material, the secondary leachate collection layer being overlaying below the primary liner and overlaying the subsurface sidewall and the subsurface floor;

a network of horizontally spaced-apart secondary leachate collection conduits contained within the drainage material of the secondary leachate collection layer and located above both the subsurface floor and the subsurface sidewall;

a secondary liner formed of materials impeding passage of liquids, the secondary liner overlaying the subsurface sidewall and the subsurface floor, the secondary liner being located between the strata and the secondary leachate collection layer;

a subsurface gallery extending along the perimeter of the subsurface floor in a generally horizontal orientation, the gallery comprising a circumferential sidewall defining the interior of the gallery, the sidewall being dimensioned to permit passage of a worker along the interior of the gallery;

means defining a passage accessible at the surface of the landfill site and permitting the worker to enter the subsurface gallery;

each of the primary and secondary leachate collection conduits having a sidewall apertured to collect leachate accumulating in the drainage material of its respective one of the primary and secondary leachate collection layers and being oriented to convey the collected leachate along its respective one of the primary and secondary leachate collection layers to the gallery, each of the primary and secondary leachate collection conduits having a discharge end portion extending through the gallery sidewall, the discharge end portions of the primary leachate collection conduits being spaced-apart from one another along the majority of the length of the gallery, the discharge end portions of the secondary leachate collection conduits being spaced-apart from one another along the majority of the length of the gallery, the discharge end portions of both the primary and secondary leachate collection conduits being accessible from the interior of the gallery whereby leachate flows from the landfill created by rainfall on the site can be monitored and the primary leachate collection conduits can be cleared of obstructions by the worker directly from the interior of the gallery and leaks in the primary liner can be detected from the interior of the gallery by inspection of leachate flows in the secondary leachate collection conduits.

* * * * *